(12) United States Patent
Wang et al.

(10) Patent No.: US 12,105,535 B1
(45) Date of Patent: Oct. 1, 2024

(54) CHANNEL MONITORING METHOD, ELECTRONIC DEVICE, AND STORAGE MEDIUM

(71) Applicant: Zhejiang Hengyi Petrochemical Co., Ltd., Hangzhou (CN)

(72) Inventors: Peng Wang, Hangzhou (CN); Xiantao Peng, Hangzhou (CN); Dake Li, Hangzhou (CN); Mingyi Liu, Hangzhou (CN); Feng Xu, Hangzhou (CN); Jun Shen, Hangzhou (CN)

(73) Assignee: Zhejiang Hengyi Petrochemical Co., Ltd., Hangzhou (CN)

( * ) Notice: Subject to any disclaimer, the term of this patent is extended or adjusted under 35 U.S.C. 154(b) by 0 days.

(21) Appl. No.: 18/393,598

(22) Filed: Dec. 21, 2023

(30) Foreign Application Priority Data

Jul. 6, 2023 (CN) .......................... 202310830901.2

(51) Int. Cl.
*G05D 1/00* (2024.01)
*G05D 1/617* (2024.01)
(Continued)

(52) U.S. Cl.
CPC ............... *G05D 1/619* (2024.01); *G06T 7/12* (2017.01); *G06V 10/26* (2022.01); *G06V 10/82* (2022.01);
(Continued)

(58) Field of Classification Search
None
See application file for complete search history.

(56) References Cited

U.S. PATENT DOCUMENTS

| 9,046,893 B2* | 6/2015 | Douglas | ................. G05D 1/024 |
| 9,317,037 B2* | 4/2016 | Byford | ................. B66F 9/0755 |

(Continued)

FOREIGN PATENT DOCUMENTS

| CN | 103935365 A | 7/2014 |
| CN | 103935635 A | 7/2014 |

(Continued)

OTHER PUBLICATIONS

CN 202310830901.2, May 7, 2024, Chinese Office Action.
(Continued)

*Primary Examiner* — Jonathan M Dager
(74) *Attorney, Agent, or Firm* — Wolf, Greenfield & Sacks, P.C.

(57) ABSTRACT

Provided is a channel monitoring method, an electronic device, and a storage medium. The method includes: obtaining scan data collected by a vehicle body collection component of an automated guided vehicle (AGV) in an area around a vehicle body; obtaining video data collected by a camera in a video collection area, where the camera is one of a plurality of cameras and is used to collect video of at least a partial area of the channel to be monitored of the plurality of channels to be monitored; in a case of determining an existence of a target object based on the scan data collected by the vehicle body collection component and/or the video data collected by the camera, obtaining a target channel where the target object is located; and generating target warning information for the target channel where the target object is located.

17 Claims, 4 Drawing Sheets

(51) Int. Cl.
*G06T 7/12* (2017.01)
*G06V 10/26* (2022.01)
*G06V 10/82* (2022.01)
*G05D 105/20* (2024.01)
*G05D 107/70* (2024.01)
*G05D 111/10* (2024.01)
*G05D 111/67* (2024.01)

(52) U.S. Cl.
CPC ..... *G05D 2105/20* (2024.01); *G05D 2107/70* (2024.01); *G05D 2111/10* (2024.01); *G05D 2111/67* (2024.01); *G06T 2207/10016* (2013.01); *G06T 2207/20021* (2013.01); *G06T 2207/20084* (2013.01)

(56) References Cited

U.S. PATENT DOCUMENTS

| | | | |
|---|---|---|---|
| 9,579,795 B2* | 2/2017 | Kokubo | B25J 9/1666 |
| 9,758,305 B2* | 9/2017 | Johnson | G06Q 10/087 |
| 9,864,371 B2* | 1/2018 | Douglas | G05D 1/0027 |
| 9,886,036 B2* | 2/2018 | Douglas | G05D 1/0217 |
| 10,255,582 B2* | 4/2019 | Shydo, Jr. | G05D 1/104 |
| 10,275,663 B2* | 4/2019 | Lee | G05D 1/0246 |
| 10,455,226 B2* | 10/2019 | Thomson | G01C 21/206 |
| 10,671,087 B2* | 6/2020 | Collett | G01C 21/206 |
| 10,850,958 B2* | 12/2020 | Göpner | B66F 9/07581 |
| 11,086,330 B2* | 8/2021 | Tu | G01C 21/3848 |
| 11,087,492 B2* | 8/2021 | Zhou | G01C 21/206 |
| 11,181,925 B2* | 11/2021 | Haeusler | G06V 20/56 |
| 11,372,421 B2* | 6/2022 | Fischer | G05D 1/0234 |
| 11,438,886 B2* | 9/2022 | Chen | G01S 17/89 |
| 11,520,304 B2* | 12/2022 | Pappas | G05B 19/042 |
| 11,565,807 B1* | 1/2023 | Zuckerman | B64C 39/024 |
| 11,756,427 B1* | 9/2023 | Reed | B66F 17/003 340/903 |
| 11,762,390 B1* | 9/2023 | Alagic | G06F 18/211 701/23 |
| 11,960,300 B2* | 4/2024 | Gariepy | G05D 1/024 |
| 2007/0040664 A1* | 2/2007 | Johnson | B60Q 1/444 340/467 |
| 2009/0074545 A1* | 3/2009 | Lert, Jr. | B65G 1/1378 414/267 |
| 2010/0266381 A1* | 10/2010 | Chilson | G05D 1/024 414/809 |
| 2011/0010023 A1* | 1/2011 | Kunzig | G01S 5/16 701/2 |
| 2011/0288684 A1* | 11/2011 | Farlow | B25J 19/023 901/1 |
| 2014/0277691 A1* | 9/2014 | Jacobus | B66F 9/24 700/216 |
| 2015/0336502 A1* | 11/2015 | Hillis | G05D 1/0088 701/23 |
| 2016/0023675 A1* | 1/2016 | Hannah | B62B 3/14 701/2 |
| 2016/0167648 A1* | 6/2016 | James | B60Q 1/50 701/28 |
| 2017/0120817 A1* | 5/2017 | Kuehnle | H04N 23/698 |
| 2017/0240098 A1* | 8/2017 | Sweeney | B60Q 1/5035 |
| 2017/0283171 A1* | 10/2017 | High | B65G 1/0492 |
| 2020/0101971 A1 | 4/2020 | Fan et al. | |
| 2020/0189103 A1* | 6/2020 | D'Ercoli | G06N 5/022 |
| 2021/0147202 A1* | 5/2021 | Black | G05D 1/0212 |
| 2021/0253128 A1* | 8/2021 | Nister | B60W 60/0027 |
| 2022/0026519 A1* | 1/2022 | Wu | G01S 7/006 |
| 2022/0099457 A1* | 3/2022 | Shibayama | H04W 4/46 |
| 2022/0113384 A1* | 4/2022 | Joseph | G01S 17/89 |
| 2022/0126901 A1* | 4/2022 | Lam | G05D 1/028 |
| 2022/0194364 A1* | 6/2022 | Ohno | B60W 30/09 |
| 2022/0214690 A1* | 7/2022 | Nichols | G01C 21/3819 |
| 2022/0332503 A1* | 10/2022 | Flick | G05D 1/0282 |
| 2023/0043474 A1* | 2/2023 | Metz | B60W 60/0017 |
| 2023/0043601 A1* | 2/2023 | Foil | G01S 7/4802 |
| 2023/0098602 A1* | 3/2023 | Cella | B29C 64/386 700/248 |
| 2023/0144662 A1* | 5/2023 | Tasinga | G06F 9/5088 718/105 |
| 2023/0234233 A1* | 7/2023 | Goyal | G06T 7/269 |

FOREIGN PATENT DOCUMENTS

| | | |
|---|---|---|
| CN | 108100079 A | 6/2018 |
| CN | 110737274 A | 1/2020 |
| CN | 210455023 U | 5/2020 |
| CN | 111796590 A | 10/2020 |
| CN | 111950420 A | 11/2020 |
| CN | 212223191 U | 12/2020 |
| CN | 113888557 A | 1/2022 |
| CN | 215679136 U | 1/2022 |
| CN | 114779727 A | 7/2022 |
| CN | 115526556 A | 12/2022 |
| EP | 3 009 388 A2 | 4/2016 |
| JP | 2019-139548 A | 8/2019 |
| JP | 2023-76406 A | 6/2023 |

OTHER PUBLICATIONS

Extended European Search Report dated Mar. 13, 2024, in connection with European Application No. 23215527.5.
Japanese Office Action dated May 7, 2024, in connection with Japanese Application No. 202310830901, with English translation thereof.
Japanese Decision to Grant a Patent dated Feb. 20, 2024, in connection with Japanese Application No. 2023-198740.
Japanese Notice of Reasons for Refusal dated Dec. 4, 2023, in connection with Japanese Application No. 2023-198740.
Chinese Office Action dated May 7, 2024, in connection with Chinese Office Application No. 202310830901, with English translation thereof.

* cited by examiner

CHANNEL MONITORING METHOD, ELECTRONIC DEVICE, AND STORAGE MEDIUM

CROSS-REFERENCE TO RELATED APPLICATIONS

The present application claims priority to Chinese Patent Application No. CN202310830901.2, filed with the China National Intellectual Property Administration on Jul. 6, 2023, the disclosure of which is hereby incorporated herein by reference in its entirety.

TECHNICAL FIELD

The present disclosure relates to a field of data processing technology, and in particular, to a channel monitoring method and apparatus, a device, and a storage medium.

BACKGROUND

In a yarn spindle production workshop, an automated guided vehicle (AGV) is an important means of transportation, and may generally move along a predetermined path. If workers appear on this path, safety accidents and even casualties may occur. Therefore, an effective monitoring method is urgently needed to effectively solve the above problems.

SUMMARY

The present disclosure provides a channel monitoring method and apparatus, a device, and a storage medium to solve or alleviate one or more technical problems in the existing technology.

According to a first aspect, provided is a channel monitoring method, including:
  obtaining scan data collected by a vehicle body collection component of an automated guided vehicle AGV in an area around a vehicle body, wherein the AGV is one of a plurality of AGVs, the AGV of the plurality of AGVs travels in any one channel to be monitored of a plurality of channels to be monitored, the plurality of channels to be monitored are a plurality of channels required to transport a yarn spindle in a yarn spindle production workshop, and the area around the vehicle body includes at least a partial area of the channel to be monitored in which the AGV is traveling;
  obtaining video data collected by a camera in a video collection area, wherein the camera is one of a plurality of cameras and is used to collect video of at least a partial area of the channel to be monitored of the plurality of channels to be monitored, and the video collection area includes at least a partial area of the channel to be monitored which is collected by the camera;
  in a case of determining an existence of a target object based on the scan data collected by the vehicle body collection component and/or the video data collected by the camera, obtaining a target channel where the target object is located, w % herein the target channel is one of the plurality of channels to be monitored; and
  generating target warning information for the target channel where the target object is located.

According to a second aspect, provided is a channel monitoring apparatus, including:
  an obtaining unit configured to obtain scan data collected by a vehicle body collection component of an automated guided vehicle AGV in an area around a vehicle body, wherein the AGV is one of a plurality of AGVs, the AGV of the plurality of AGVs travels in any one channel to be monitored of a plurality of channels to be monitored, the plurality of channels to be monitored are a plurality of channels required to transport a yarn spindle in a yarn spindle production workshop, and the area around the vehicle body includes at least a partial area of the channel to be monitored in which the AGV is traveling; and configured to obtain video data collected by a camera in a video collection area, wherein the camera is one of a plurality of cameras and is used to collect video of at least a partial area of the channel to be monitored of the plurality of channels to be monitored, and the video collection area includes at least a partial area of the channel to be monitored which is collected by the camera; and
  a processing unit configured to, in a case of determining an existence of a target object based on the scan data collected by the vehicle body collection component and/or the video data collected by the camera, obtain a target channel where the target object is located, wherein the target channel is one of the plurality of channels to be monitored; and configured to generate target warning information for the target channel where the target object is located.

According to a third aspect, provided is an electronic device, including: at least one processor; and a memory connected in communication with the at least one processor. The memory stores an instruction executable by the at least one processor, and the instruction, when executed by the at least one processor, enables the at least one processor to execute the method of any embodiment of the present disclosure.

According to a fourth aspect, provided is a non-transitory computer-readable storage medium storing a computer instruction thereon, and the computer instruction is used to cause a computer to execute the method of any embodiment of the present disclosure.

According to a fifth aspect, provided is a computer program product including a computer program, and the computer program implements the method of any embodiment of the present disclosure, when executed by a processor.

Accordingly, according to the present disclosure, it is capable of detecting the obtained scan data and/or video data, and thus the response efficiency of warning information may be effectively improved and simultaneously, the monitoring data of different precisions may lay a foundation for effectively improving the efficiency of security inspections It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers refer to the same or similar components or elements throughout several figures, unless otherwise specified. These drawings are not necessarily drawn in scale. It should be understood that these drawings depict only some embodiments provided according to the present disclosure and are not to be considered as a limitation to the present disclosure.

DETAILED DESCRIPTION

Figure 1:
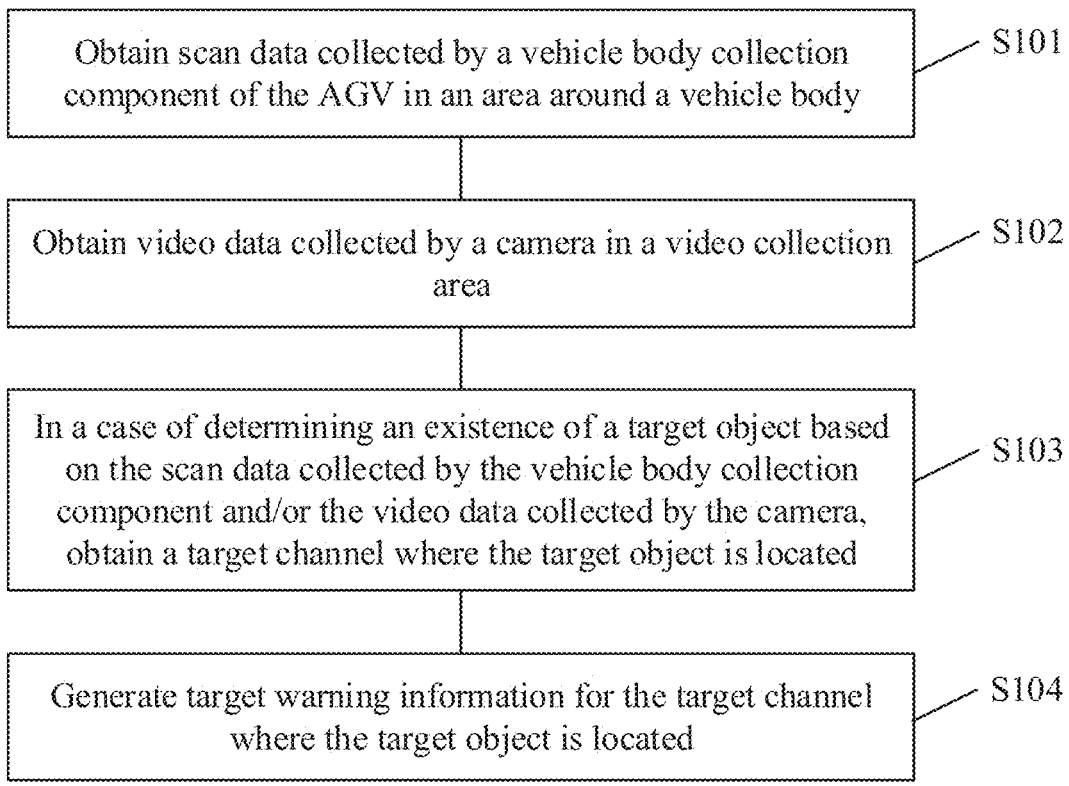
FIG. 1 is a schematic flowchart of a channel monitoring method according to an embodiment of the present application.

Hereinafter, the present disclosure will be further described in detail with reference to the drawings. The same reference numbers in the drawings indicate functionally identical or similar elements. Although various aspects of the embodiments are illustrated in the drawings, the drawings are not necessarily drawn in scale, unless otherwise indicated.

In addition, in order to better explain the present disclosure, many specific details are given in the specific embodiments below. It will be understood by those skilled in the art that the present disclosure may be implemented without certain specific details. In some instances, methods, means, elements, circuits, and the like that are well known to those skilled in the art are not described in detail in order to highlight the gist of the present disclosure.

Currently, in a yarn spindle production workshop, the produced yarn spindles are usually transported to designated locations by an automated guided vehicle (AGV). However, in the yarn spindle production workshop using AGV, there will be a situation where workers and vehicles travel at the same time. In this situation, especially when a channel is narrow, there is a risk of collision accidents, causing damage to the AGV and even casualties. Therefore, in order to reduce damage to the AGV and effectively avoid personnel injuries, a real-time and efficient monitoring solution is urgently required.

Based on this, the present disclosure provides a channel monitoring method to monitor a plurality of channels where the AGV travels in real time and efficiently.

Specifically, FIG. 1 is a schematic flowchart of a channel monitoring method according to an embodiment of the present application. The method may be optionally applied in an electronic device, such as a personal computer, a server, a server cluster and the like. The method may include at least a part of the following contents. As shown in FIG. 1, the method may include the following steps.

Step S101: obtaining scan data collected by a vehicle body collection component of the AGV in an area around a vehicle body.

Here, the AGV may be one of a plurality of AGVs. The AGV of the plurality of AGVs may travel in any one channel to be monitored of a plurality of channels to be monitored. The plurality of channels to be monitored may be a plurality of channels required to transport a yarn spindle in a yarn spindle production workshop. The area around the vehicle body may include at least a partial area of the channel to be monitored in which the AGV is traveling.

In one example, the vehicle body collection component (e.g., lidar) may be provided on the front of the AGV. Further, the vehicle body collection component (e.g., lidar) may also be provided on the rear of the AGV. In this way, the AGV in the channel to be monitored can always collect data in a travel direction.

Step S102: obtaining video data collected by a camera in a video collection area.

Here, the camera may be one of a plurality of cameras. The camera may be used to collect video of at least a partial area of the channel to be monitored of the plurality of channels to be monitored. The video collection area may include at least a partial area of the channel to be monitored which may be collected by the camera.

It can be understood that at least one camera may be provided in the same channel to be monitored, so as to monitor the channel to be monitored. Further, in a case where two or more cameras are provided in the same channel to be monitored, the video collection areas of different cameras may be different, as long as the channel to be monitored may be monitored. The present disclosure does not limit a specific location of the camera. Further, the number of cameras provided in different channels to be monitored may be the same or different, and the present disclosure does not limit the number of cameras.

Step S103: in a case of determining an existence of a target object based on the scan data collected by the vehicle body collection component and/or the video data collected by the camera, obtaining a target channel where the target object is located.

Here, the target channel is one of the plurality of channels to be monitored.

It can be understood that according to the present disclosure, the target channel where the target object is located may be obtained in the case of determining the existence of the target object based on the scan data collected by the vehicle body collection component, the target channel where the target object is located may be obtained in the case of determining the existence of the target object based on the video data collected by the camera, or the target channel where the target object is located may be obtained in the case of determining the existence of the target object based on the scan data collected by the vehicle body collection component and the video data collected by the camera.

In an example, the target object may include, but is not limited to, at least one of a worker and an AGV that has stopped working.

Step S104: generating target warning information for the target channel where the target object is located.

In an example, the target warning information may include preset warning signals, such as warning audio (e.g., preset broadcast), warning lights, warning telephone calls and the like, which are not limited by the present disclosure.

In this way, according to the present disclosure, it is capable of determining whether a target object exist based on the obtained scan data and/or video data, so as to quickly position the target channel where the target object is located, and then generating the target warning information for the target channel. Thus, the response efficiency of warning information may be effectively improved, and simultaneously, the monitoring data of different precisions may lay a foundation for effectively improving the efficiency of security inspections.

Further, according to the present disclosure, in application scenario of yarn spindle production, it is capable of quickly notifying the workers based on the generated warning information, so as to make timely avoidance or eliminate hazards. In this way, it is capable of providing technical support to effectively reduce the damage to AGV and production equipment as well as to effectively avoid personal injury, thereby ensuring the normal operation of the workshop to a great extent and improving the safety of the workshop.

In a specific example of the present disclosure, the target warning information for the target channel where the target object is located may be obtained by using the following methods. Specifically, in the case of determining the existence of the target object based on the scan data collected by the vehicle body collection component and/or the video data collected by the camera, obtaining the target channel where the target object is located, and generating the target warning information for the target channel where the target object is located (i.e., the above step S103) may include one of the followings.

First method: in the case of determining the existence of the target object in the scan data collected by the vehicle body collection component based on the scan data, obtaining the target channel where the target object in the scan data is located, and generating scan warning information for the target channel where the target object in the scan data is located.

It can be understood that in the first method, the scan data collected by the vehicle body collection component of the AGV may be detected to determine whether the target object exists, and when it is determined that the target object exists, the target channel where the target object in the scan data is located may be obtained. At this time, the scan warning information for the target channel where the target object in the scan data is located may be directly generated.

Second method: in the case of determining the existence of the target object in the video data collected by the camera based on the video data, obtaining the target channel where the target object in the video data is located, and generating video warning information for the target channel where the target object in the video data is located.

It can be understood that in the second method, the video data collected by the camera in the video collection area may be detected to determine whether the target object exists, and when it is determined that the target object exists, the target channel where the target object in the video data is located may be obtained. At this time, the video warning information for the target channel where the target object in the video data is located may be directly generated.

It should be noted that the "target object" existing in the above-mentioned scan data and the "target object" existing in the above-mentioned video data may be the same "target object", or may be two different "target objects", which are not limited by the present disclosure.

Third method: in the case of determining the existence of the target object in the scan data collected by the vehicle body collection component based on the scan data, obtaining the target channel where the target object in the scan data is located; in the case of determining the existence of the target object in the video data collected by the camera based on the video data, obtaining the target channel where the target object in the video data is located; and in a case of determining the obtained target channel where the target object in the scan data is located being the same as the obtained target channel where the target object in the video data is located, generating hybrid warning information for the target channel.

That is to say, in the third method, the warning information may be not directly generated when it is determined that the target object exists in the scan data, the warning information may be also not directly generated when it is determined that the target object exists in the video data, and it is necessary to further determine whether the target channel where the target object in the scan data is located is the same as the target channel where the target object in the video data is located. Further, when it is determined that the target channel where the target object in the scan data is located is the same as the target channel where the target object in the video data is located, the hybrid warning information for the target channel will be generated. Alternatively, when it is determined that the target channel where the target object in the scan data is located is different from the target channel where the target object in the video data is located, the scan warning information for the target channel where the target object in the scan data is located may be generated, and the video warning information for the target channel where the target object in the video data is located may be generated.

By way of example, in an example, the scan data collected by the vehicle body collection component may be detected and it may be determined that worker A exists in the scan data, and then the target channel where worker A is located may be obtained. The video data collected by the camera in the video collection area may be detected and it may be determined that worker A also exists in the video data, and then the target channel where worker A is located may be obtained. Accordingly, it can be considered that the area collected by the vehicle body collection component and the area collected by the camera correspond to the same channel to be monitored, that is, the target channels of the areas are the same. Accordingly, the hybrid warning information for the target channel may be generated.

Alternatively, in another example, the scan data collected by the vehicle body collection component may be detected and it may be determined that worker A exists in the scan data, and then the target channel where worker A is located is obtained. The video data collected by the camera in the video collection area may be detected and it may be determined that worker B exists in the video data, and then the target channel where worker B is located may be obtained. If the target channel corresponding to the worker A is the same as the target channel corresponding to the worker B the two are the same, that is, the workers A and B belong to the same channel, it can be determined that the workers A and B exist in the same target channel. Accordingly, the hybrid warning information for the target channel may be generated.

Alternatively, in yet another example, the scan data collected by the vehicle body collection component may be detected and it may be determined that worker A exists in the scan data, and then the target channel where worker A is located is obtained. The video data collected by the camera in the video collection area may be detected and it may be determined that worker B exists in the video data, and then the target channel where worker B is located may be obtained. If the target channel corresponding to the worker A is different from the target channel corresponding to the worker B the two are the same, it can be determined that there is the worker in the different target channel. Accordingly, the warning information for respective target channels may be generated. For example, the scan warning information for the target channel where the target object in the scan data is located may be generated for the scan data, and the video warning information for the target channel where the target object in the video data is located may be generated for the video data.

It should be noted that in actual applications, the warning information may be generated by using one, any two or all of the above three methods according to different scene requirements, which is not limited by the present disclosure.

In a specific example according to the present disclosure, priorities of the hybrid warning information, the scan warning information and the video warning information gradually decreases.

That is to say, in this example, the priority of the hybrid warning information is greater than that of the scan warning information, and the priority of the scan warning information is greater than that of the video warning information.

It should be understood that the warning information of different priorities may be different. In this way, it is convenient for a worker to clearly distinguish the priority of the current warning information, thereby further improving monitoring precision and accuracy.

Further, different processing measures may also be set according to the above-mentioned priorities. For example, the hybrid warning information generated by the third method may indicate a highest level of danger, and accordingly, a highest-level control instruction for remote control of the AGV traveling in the target channel may be generated while generating the hybrid early warning information. This highest-level control instruction may be used to control the AGV to adjust the current operation state, for example, to adjust from the current normal operation state to a temporary stopping state, and return to the normal operation state after stopping for a preset duration. Alternatively, the highest-level control instruction may be used to adjust the current planned path to avoid the target object, etc.

For another example, the scan warning information generated by the first method may indicate a sub-high-level of danger, and accordingly, a sub-high-level control instruction for remote control of the AGV traveling in the target channel may be generated while generating the scan warning information. This sub-high-level control instruction may be used to control the AGV to adjust the current driving speed, such as deceleration processing and the like. For yet another example, the video warning information generated by the second method may indicate a normal level of danger, and accordingly, only the video warning information may be generated to remind the worker.

In this way, corresponding emergency measures may be taken according to different warning situations, and accordingly, it is capable of greatly improving the monitoring precision and accuracy, and laying the foundation for ensuring the normal operation of the workshop to a great extent and improving the safety of workshop operations.

In a specific example according to the present disclosure, after the scan data is obtained, whether the target object exists in the scan data may be determined by the following.

Inputting a scan image included in the scan data collected by the vehicle body collection component into a first detection model to obtain a first detection result. The first detection model may be used to identify whether there is at least a part of partial features of the target object in the scan image, and the first detection result may represent whether the target object exists in the scan image included in the scan data.

It can be understood that the scan image included in the scan data may contain at least a part of partial features of the target object, such as a limb of the worker. Accordingly, the first detection model may be used to identify the scan image to determine wiether there is at least a part of the partial features of the target object, thereby determining whether the target object exists in the scan image included in the scan data.

Further, in a specific example, the first detection result may be obtained in a following manner. Specifically, above-mentioned inputting the scan image included in the scan data collected by the vehicle body collection component into the first detection model to obtain the first detection result may include the following steps.

Step 1-1: preprocessing the scan image included in the scan data collected by the vehicle body collection component to remove an edge area in the scan image and obtain a sub-image corresponding to a center area in the scan image.

For example, the edge area in the scan image may be removed, the area (i.e., the center area) in the scan image where the channel is located may be retained, and then the sub-image corresponding to the area (i.e., the center area) in the scan image where the channel is located may be obtained, thereby effectively improving identification processing efficiency of image identification through the first detection model, and thus improving the model processing efficiency.

It can be understood that the above-mentioned preprocessing may also include image scaling processing on the scan image included in the scan data, normalization processing of pixel values in the image, etc.

Step 1-2: inputting the sub-image corresponding to the center area in the scan image to the first detection model to obtain the first detection result.

Here, the first detection model may be used to extract features from the sub-image corresponding to the center area in the scan image, obtain a feature map of the center area, and detect whether there is at least a part of partial features of the target object in the feature map of the center area.

Further, in a specific example, the first detection model may include at least a first network layer, a second network layer, and a third network layer.

Here, the first network layer may be used to perform feature extraction on the sub-image corresponding to the center area to obtain at least one feature map corresponding to the sub-image, where a quantity of the at least one feature map is negatively correlated to a size of a feature block of the at least one feature map. Further, in an example, during a process of performing the feature extraction of the sub-image, the first network layer may reduce the size of the feature block of the extracted feature map, for example, reduce it to a preset value, so as to increase the number of the feature maps. In this way, rich feature information may be obtained while ensuring the complexity of the model, thereby improving accuracy of the model recognition result.

Further, the second network layer may be used to predict whether there is at least a part of partial features of the target object based on the at least one feature map corresponding to the sub-image, and obtain a probability value. For example, a specific value greater than 0 and less than 1 may be obtained.

Further, the third network layer may be used to process the probability value obtained by the second network layer to obtain a first value or a second value, where the first detection result is the first value or the second value. The first value may be used to represent the presence of at least a part of the partial features of the target object, and the second value may be used to represent the absence of at least a part of the partial features of the target object.

Figure 2:
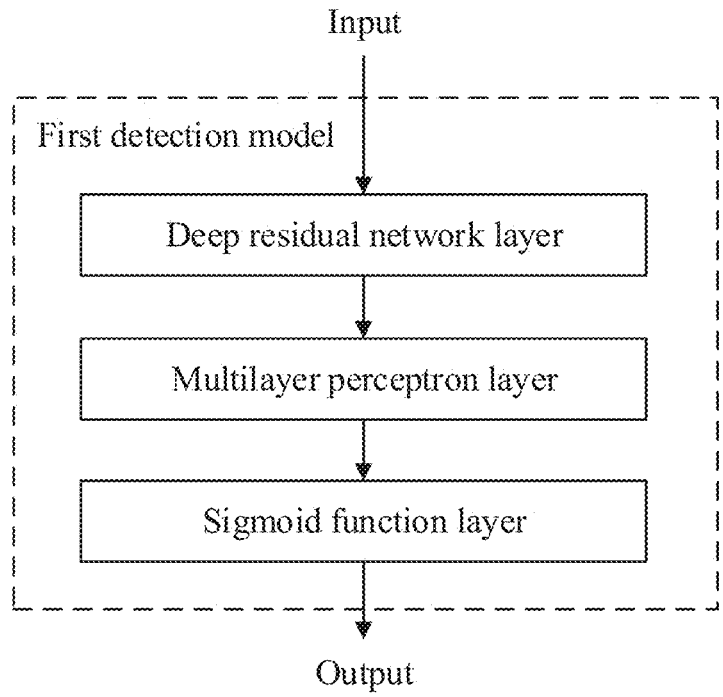
FIG. 2 is a schematic structural diagram of a first detection model according to an embodiment of the present application.

By way of example, in an example, the above-mentioned first network layer may be a deep residual network (ResNet)

layer, the above-mentioned second network layer may be a multilayer perceptron (MLP) layer, and the above-mentioned third network layer may be a nonlinear activation layer, such as a Sigmoid function layer. As shown in FIG. 2, firstly, the sub-image corresponding to the center area in the scan image may be input to the ResNet layer in the first detection model, to obtain at least one feature map corresponding to the sub-image. Secondly, the at least one feature map corresponding to the sub-image may be input to the MLP layer, to predict the probability value of the presence of at least a part of partial features of the target object in the sub-image. Finally, the predicted probability value may be input to the Sigmoid function layer to obtain an output result, such as the first value or the second value. Further, when the output result is the first value, it may mean that there is at least a part of partial features of the target object in the sub-image, and when the output result is the second value, it may mean that there are no at least a part of partial features of the target object in the sub-image.

In a specific example according to the present disclosure, after the video data is obtained, whether the target object exists in the video data may be determined by the following.

Inputting the video data collected by the camera into a second detection model to obtain a second detection result. The second detection model may be used to identify whether the target object exists in the video data, for example, whether an overall outline of the target object exists, and the second detection result may represent whether the target object exists in the video data, for example, whether the overall outline of the target object exists.

Here, a time complexity of the second detection model may be greater than a time complexity of the first detection model.

It can be understood that since the second detection model identifies the overall contour of the target object while the first detection model identifies partial features of the target object, in terms of processing efficiency, the processing efficiency of the first detection model may be greater than that of the second detection model. For example, the time complexity of the first detection model may be smaller than the time complexity of the second detection model. In this way, the overall processing efficiency of the channel monitoring method may be effectively improved in a case of effectively ensuring different monitoring precisions according to the present disclosure.

In a specific example according to the present disclosure, the second detection result may be obtained in a following manner. Specifically, above-mentioned inputting the video data collected by the camera into the second detection model to obtain the second detection result may include the following steps.

Step 2-1: preprocessing the video data collected by the camera to obtain a video image set.

Here, the video image set may include at least one group of two adjacent frames of video images. The two adjacent frames of video images may meet the following requirement: a difference value between the feature maps of the two adjacent frames of video images is greater than a preset difference value. Here, the preset difference value is an empirical value and may be set according to actual needs, which is not limited by the present disclosure.

That is to say, after the video data is obtained, it is required to select the video images that meet a requirement from the video data. For example, the video images with a large difference value between the feature maps of the two adjacent frames of video images may be selected to form a video image set. In this way, it is capable of maximizing model processing efficiency.

Step 2-2: inputting each video image in the video image set to the second detection model to obtain a sub-result corresponding to the video image. For example, the sub-results corresponding to each video image may be obtained.

Step 2-3: in a case of at least one sub-result among the sub-results of all video images in the video image set being a third value, determining the third value as the second detection result. Alternatively, in a case of the sub-result of each video image in the video image set being a fourth value, determining the fourth value as the second detection result. The third value may be used to represent the existence of the target object, and the fourth value may be used to represent the existence of no target object.

That is to say, as long as one sub-result is the third value, such as a preset character (e.g., 1), it may mean that the target object exists in the video data. Otherwise, in a case of all sub-results are the fourth value (e.g., 0), it may mean that no target object exists in the video data.

Further, in a specific example, the second detection model may include at least a fourth network layer, a fifth network layer and a sixth network layer.

Figure 3:
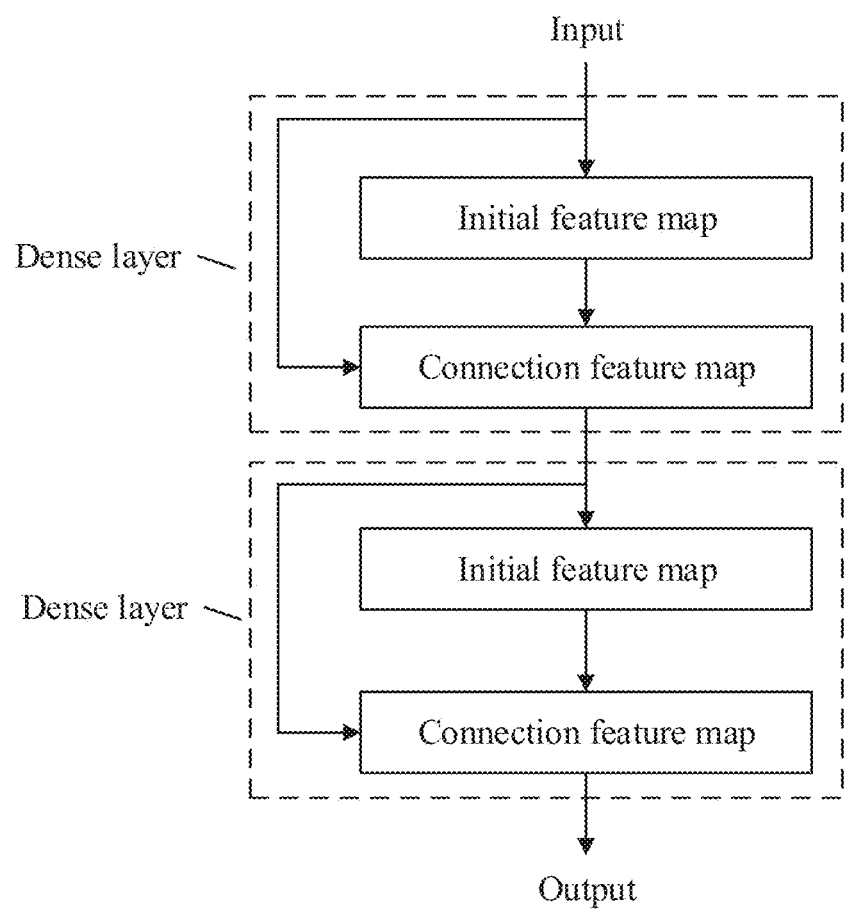
FIG. 3 is a schematic structural diagram of a fourth network layer including two dense layers according to an embodiment of the present application.

Here, the fourth network layer may include at least two dense layers connected in sequence, where a connection feature map of the previous dense layer may be used as an initial feature map of the next dense layer. For example, as shown in FIG. 3, the fourth network layer may include two dense layers, where the connection feature map of the first dense layer may be used as the initial feature map of the second dense layer. Further, the at least two dense layers may be used to perform convolution processing on the initial feature map to obtain a convolution feature map, and connection processing may be performed on the initial feature map and the convolution feature map to obtain a connection feature map. Here, the initial feature map of the first dense layer of the at least two dense layers may be obtained based on the video image. In this way, the amount of calculation may be effectively reduced while effectively ensuring the speed of inference as well as the richness and accuracy of feature extraction, and the size of the feature map may be reduced.

Further, the fifth network layer may be used to perform feature aggregation on the connection feature map of the last dense layer of the at least two dense layers to obtain a target feature map.

Further, the sixth network layer may be used to predict the target feature map to obtain the third value or the fourth value. Here, the third value may be used to represent the existence of the target object, and the fourth value may be used to represent the existence of no target object.

Figure 4:
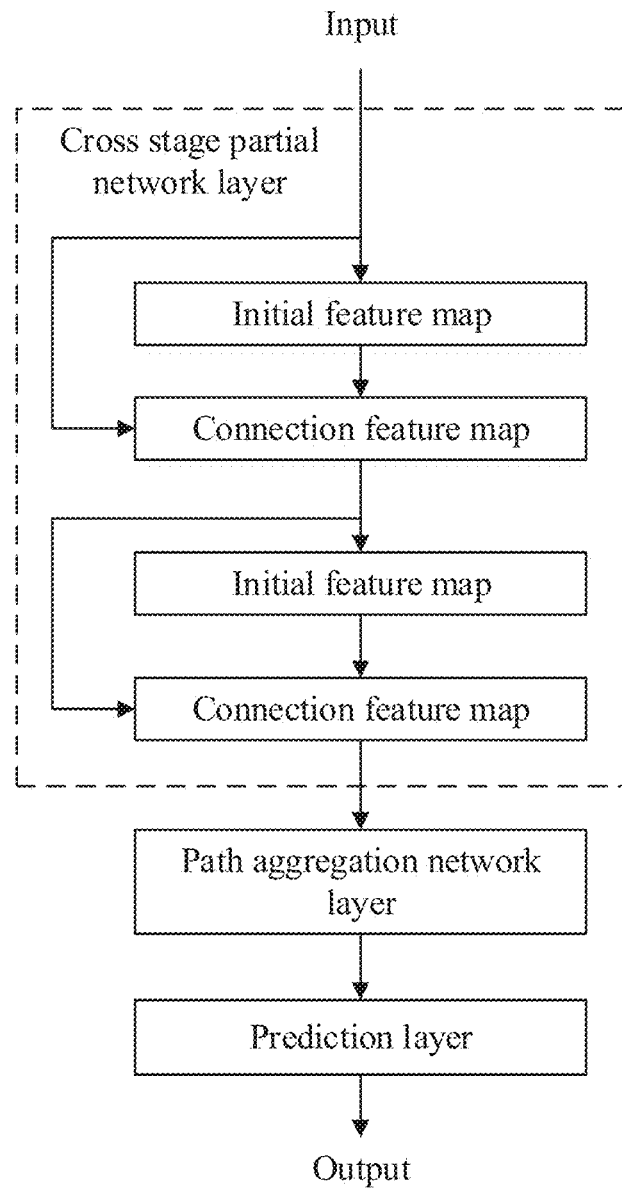
FIG. 4 is a schematic structural diagram of a second detection model according to an embodiment of the present application.

By way of example, in an example, the above-mentioned fourth network layer may be a cross stage partial network (CSPNet) layer. For example, the CSPNet layer may include two dense layers. Further, the above-mentioned fifth network layer may be a path aggregation network (PANet) layer, and further, the above-mentioned sixth network layer may be a prediction layer. As shown in FIG. 4, firstly, the video image in the video image set may be input to the CSPNet layer in the second detection model to obtain the connection feature map corresponding to the video image; secondly, the connection feature map may be input to the PANet layer to obtain the target feature map after feature aggregation processing; finally, the target feature map may be input to the prediction layer to obtain an output result, for example, the third value or the fourth value. Further, in a case of the output result being the third value, it may mean that the target object exists in the video data, and in a case of the output result being the fourth value, it may mean that no target object exists in the video data.

In a specific example according to the present disclosure, after obtaining the target channel where the target object in the video data is located, the method may further include determining whether the AGV is traveling in the target channel.

Further, above-mentioned generating the video warning information for the target channel where the target object in the video data is located may specifically include generating the video warning information for the target channel where the target object in the video data is located when it is determined that the AGV is traveling.

That is to say, when a target object is detected in the video data and the target channel where the target object is located is determined, it may also be determined whether an AGV is traveling in the target channel. Further, when an AGV is traveling in the target channel, the video warning information for the target channel where the target object in the video data is located may be generated. Otherwise, there is no need to generate the video warning information.

Further, in an example, when it is determined that an AGV is traveling in the target channel, a distance between the target object and the AGV may be further determined. When the distance is less than a preset safety distance, the video warning information for the target channel where the target object in the video data is located may be generated.

Here, the preset safety distance may be an empirical value and may be set according to actual needs, which is not limited by the present disclosure.

In summary, compared with the existing technology, the channel monitoring method provided according to the present disclosure has the following advantages.

First, the processing efficiency and accuracy of target object detection may be improved. According to the present disclosure, different detection models may be used for processing different monitoring data. Accordingly, the processing efficiency of detection and the accuracy of identifying target objects may be greatly improved.

Second, the response efficiency of warnings may be improved. According to the present disclosure, data with different monitoring precisions may be monitored, and thus it is capable of quickly learning the safety situation in the channel. For channels with target objects, it is capable of quickly generating warning information, so that workers may take corresponding measures in a timely manner.

Third, the safety of the workshop may be improved. According to the present disclosure, it is capable of providing technical support for effectively reducing the incidence of safety accidents in the yarn spindle production workshop, thereby laying the foundation for reducing damage to AGVs and production equipment, and effectively avoiding personnel injuries. Accordingly, it is capable of greatly ensuring the normal operation of the workshop and improving the overall safety of the workshop.

Figure 5:
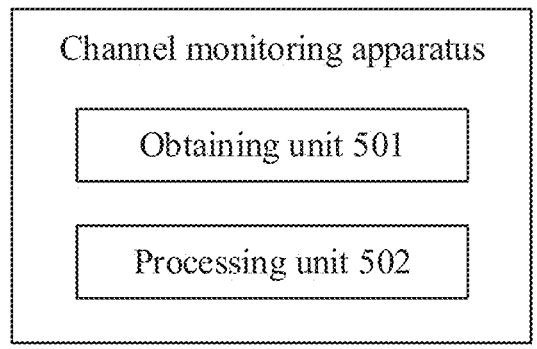
FIG. 5 is a schematic structural diagram of a channel monitoring apparatus according to an embodiment of the present application.

The present disclosure also provides a channel monitoring apparatus. As shown in FIG. 5, the channel monitoring apparatus may include the following components.

An obtaining unit 501 may be used to obtain scan data collected by a vehicle body collection component of the AGV in an area around the vehicle body, where the AGV may be one of a plurality of AGVs, the AGV of the plurality of AGVs may travel in any one channel of a plurality of channels to be monitored, the plurality of channels to be monitored may be a plurality of channels required to transport a yarn spindle in a yarn spindle production workshop, the area around the vehicle body may include at least a partial area of the channel to be monitored in which the AGV is traveling; and to obtain video data collected by a camera in a video collection area, where the camera may be one of a plurality of cameras used to collect video of at least a partial area of the channel of the plurality of channels to be monitored, and the video collection area may include at least a partial area of the channel to be monitored which may be collected by the camera.

A processing unit 502 may be used to, in a case of determining an existence of a target object based on the scan data collected by the vehicle body collection component and/or the video data collected by the camera, obtain a target channel where the target object is located, where the target channel is one of the plurality of channels to be monitored; and to generate target warning information for the target channel where the target object is located.

In a specific example according to the present disclosure, the processing unit 502 may be specifically used for one of the followings.

In a case of determining the existence of the target object in the scan data collected by the vehicle body collection component based on the scan data, obtaining the target channel where the target object in the scan data is located, and generating scan warning information for the target channel where the target object in the scan data is located.

In a case of determining the existence of the target object in the video data collected by the camera based on the video data, obtaining the target channel where the target object in the video data is located, and generating video warning information for the target channel where the target object in the video data is located.

In the case of determining the existence of the target object in the scan data collected by the vehicle body collection component based on the scan data, obtaining the target channel where the target object in the scan data is located; in the case of determining the existence of the target object in the video data collected by the camera based on the video data, obtaining the target channel where the target object in the video data is located; and in a case of determining the obtained target channel where the target object in the scan data is located being the same as the obtained target channel where the target object in the video data is located, generating hybrid warning information for the target channel.

In a specific example according to the present disclosure, priorities of the hybrid warning information, the scan warning information and the video warning information gradually decreases.

In a specific example according to the present disclosure, the processing unit 502 may be also used to input a scan image included in the scan data collected by the vehicle body collection component to a first detection model to obtain a first detection result. The first detection model may be used to identify whether there is at least a part of partial features of the target object in the scan image, and the first detection result may represent whether the target object exists in the scan image included in the scan data.

In a specific example according to the present disclosure, the processing unit 502 may be specifically used to preprocess the scan image included in the scan data collected by the vehicle body collection component to remove an edge area in the scan image and obtain a sub-image corresponding to a center area in the scan image, and input the sub-image corresponding to the center area in the scan image to the first detection model to obtain the first detection result. Here, the first detection model may be used to extract features from the sub-image corresponding to the center area in the scan image, obtain a feature map of the center area, and detect whether there is at least a part of partial features of the target object in the feature map of the center area.

In a specific example according to the present disclosure, the first detection model includes at least a first network layer, a second network layer and a third network layer.

Here, the first network layer may be used to perform feature extraction on the sub-image corresponding to the center area to obtain at least one feature map corresponding to the sub-image, where the quantity of the at least one feature map is negatively correlated to a size of a feature block of the at least one feature map. The second network layer may be used to predict whether there is at least a part of partial features of the target object based on at least one feature map corresponding to the sub-image, and obtain a probability value.

The third network layer may be used to process the probability value to obtain a first value or a second value, where the first detection result is the first value or the second value. The first value may be used to represent the presence of at least a part of the partial features of the target object, and the second value may be used to represent the absence of at least a part of the partial features of the target object.

In a specific example according to the present disclosure, the processing unit 502 may be also used to input the video data collected by the camera into a second detection model to obtain a second detection result. The second detection model may be used to identify whether the target object exists in the video data, and the second detection result may represent whether the target object exists in the video data. The time complexity of the second detection model may be greater than the time complexity of the first detection model.

In a specific example according to the present disclosure, the processing unit 502 may be also used to preprocess the video data collected by the camera to obtain a video image set, where the video image set may include at least one group of two adjacent frames of video images, and the two adjacent frames of video images may meet the following requirement: a difference value between the feature maps of the two adjacent frames of video images is greater than a preset difference value; input each video image in the video image set to the second detection model to obtain a sub-result corresponding to the video image; and in a case of at least one sub-result among the sub-results of all video images in the video image set being a third value, determining the third value as the second detection result, or in a case of the sub-result of each video image in the image set being a fourth value, determining the fourth value as the second detection result. The third value may be used to represent the existence of the target object, and the fourth value may be used to represent the existence of no target object.

In a specific example according to the present disclosure, the second detection model may include at least a fourth network layer, a fifth network layer and a sixth network layer.

Here, the fourth network layer may include at least two dense layers connected in sequence, where a connection feature map of the previous dense layer may be used as an initial feature map of the next dense layer. The at least two dense layers may be used to perform convolution processing on the initial feature map to obtain a convolution feature map, and connection processing may be performed on the initial feature map and the convolution feature map to obtain a connection feature map. The initial feature map of the first dense layer of the at least two dense layers may be obtained based on the video image.

The fifth network layer may be used to perform feature aggregation on the connection feature map of the last dense layer of the at least two dense layers to obtain a target feature map.

The sixth network layer may be used to predict the target feature map to obtain the third value or the fourth value.

In a specific example according to the present disclosure, the processing unit 502 may be also used to determine whether an AGV is traveling in the target channel where the target object in the video data is located after obtaining the target channel; and generate, when it is determined that the AGV is driving, the video warning information for the target channel where the target object in the video data is located.

Descriptions of specific functions and examples of each unit of the apparatus according to embodiments of the present disclosure may refer to the relevant description of the corresponding steps in the above method embodiments, and will not be provided again herein.

In the technical solution of the present disclosure, the collection, storage, application and the like of the user's personal information involved are all in compliance with the provisions of relevant laws and regulations, and do not violate public order and good customs.

Figure 6:
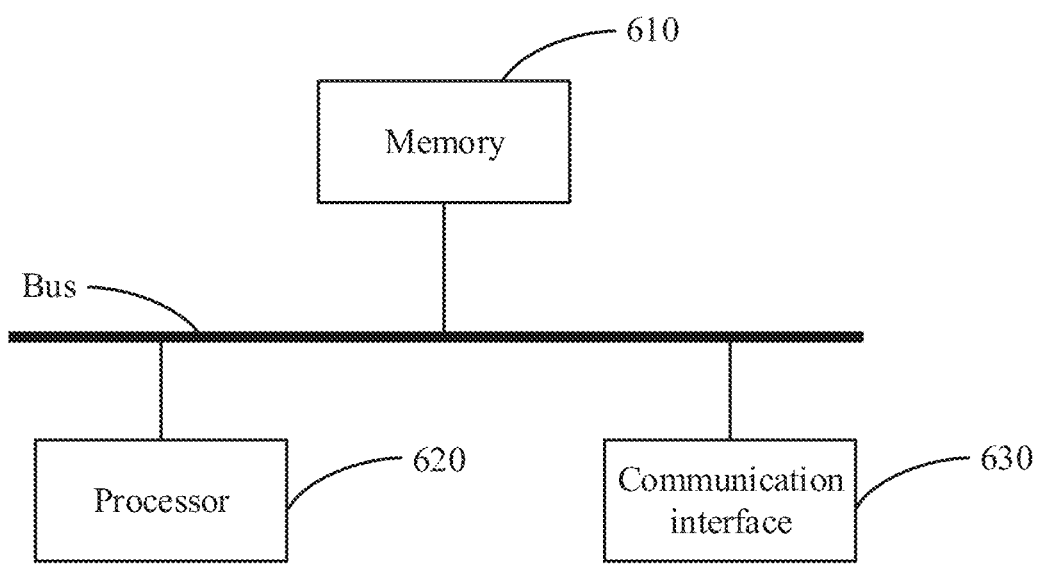
FIG. 6 is a block diagram of an electronic device for implementing a channel monitoring method according to an embodiment of the present application.

FIG. 6 is a structural block diagram of an electronic device according to an embodiment of the present application. As shown in FIG. 6, the electronic device may include a memory 610 and a processor 620. The memory 610 may store a computer program that may be executed on the processor 620. The number of the memory 610 and processor 620 may be one or more. The memory 610 may store one or more computer programs. When the one or more computer programs are executed by the electronic device, the electronic device may perform the method provided by the above method embodiments. The electronic device may also include a communication interface 630 for communicating with external devices so as to perform interactive data transmission.

If the memory 610, the processor 620 and the communication interface 630 are implemented independently, the memory 610, the processor 620 and the communication interface 630 may be connected to each other through a bus and communicate with each other. The bus may be an industry standard architecture (ISA) bus, a peripheral component interconnect (PCI) bus, or an extended industry standard architecture (EISA) bus, etc. The bus may be divided into address bus, data bus, control bus, etc. For ease of illustration, only one thick line is used in FIG. 6, but it does not mean that there is only one bus or one type of bus.

Optionally, in terms of specific implementation, if the memory 610, the processor 620 and the communication interface 630 are integrated on one chip, the memory 610, the processor 620 and the communication interface 630 may communicate with each other through an internal interface.

It should be understood that the above-mentioned processor may be a central processing unit (CPU), or may be other general-purpose processor, a digital signal processor (DSP), an application specific integrated circuit (ASIC), a field programmable gate array (FPGA) or other programmable logic device, a discrete gate, a transistor logic device, a discrete hardware component, etc. The general-purpose processor may be a microprocessor or any conventional processor, etc. It is worth noting that the processor may be a processor that supports advanced RISC machines (ARM) architecture.

Further, optionally, the above-mentioned memory may include read-only memory and random access memory, and may also include non-volatile random access memory. The memory may be a volatile memory or a non-volatile memory, or may include both volatile memory and non-volatile memory. Among them, the non-volatile memory may include read-only memory (ROM), programmable read-only memory (PROM), erasable programmable read-only memory (EPROM), electrically erasable programmable read-only memory (EEPROM) or flash memory. The volatile memory may include random access memory (RAM), which may be used as an external cache. By way of illustration, but not limitation, many forms of RAM are available. For example, static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous link dynamic random access memory (SLDRAM) and direct memory bus random access memory (Direct RAMBUS RAM, DR RAM).

In the above embodiments, it may be implemented in whole or in part using software, hardware, firmware, or any combination thereof. When implemented using software, it may be implemented in whole or in part in the form of a computer program product. The computer program product may include one or more computer instructions. When the computer instructions are loaded and executed on a computer, processes or functions described according to embodiments of the present disclosure may be generated in whole or in part. The computer may be a general purpose computer, a special purpose computer, a computer network, or other programmable apparatus. The computer instructions may be stored in a computer-readable storage medium or transmitted from a computer-readable storage medium to another computer-readable storage medium. For example, the computer instructions may be transferred from a website, computer, server, or data center to another website, computer, server or data center through wired means (e.g., coaxial cable, optical fiber, digital subscriber line (DSL)) or wireless means (e.g., infrared, Bluetooth, microwave, etc.). The computer-readable storage medium may be any available medium that may be accessed by a computer, or a data storage device such as a server or data center integrated with one or more available media. The available media may be magnetic media (e.g., floppy disk, hard disk, and magnetic tape), optical media (e.g., digital versatile disc (DVD)) or semiconductor media (e.g., solid state disk (SSD)), etc. It is worth noting that the computer-readable storage medium mentioned in this disclosure may be a non-volatile storage medium, that is, a non-transitory storage medium.

Those having ordinary skill in the art may understand that all or part of the steps to implement the above embodiments may be completed using hardware, or may be completed by instructing relevant hardware through a program. The program may be stored in a computer-readable storage medium. The above-mentioned storage medium may be a read-only memory, a magnetic disk, an optical disk, etc.

In the description of embodiments of the present disclosure, the description with reference to the terms "one embodiment", "some embodiments", "an example", "a specific example", or "some examples" or the like means that a specific feature, structure, material, or characteristic described in combination with the embodiment or example should be included in at least one embodiment or example of the present disclosure. Furthermore, the described specific feature, structure, material or characteristic may be combined in any suitable manner in any one or more embodiments or examples. Furthermore, those skilled in the art may combine different embodiments or examples described in this specification as well as features of different embodiments or examples, unless they are inconsistent with each other.

In the description of the embodiments of the present disclosure, "/" means or, unless otherwise specified. For example, "A/B" may mean A or B. The term "and/or" herein only describes an association relation of associated objects, which indicates that there may be three kinds of relations, for example, A and/or B may indicate that there is only A exists, or there are both A and B exist, or there is only B exists.

In the description of the embodiments of the present disclosure, the term "first" and "second" herein are used for descriptive purposes only, and cannot be understood to indicate or imply relative importance or implicitly indicate the number of indicated technical features. Therefore, features defined by "first" and "second" may explicitly or implicitly include one or more of these features. In the description of the embodiments of the present disclosure, "a plurality of" means two or more, unless otherwise specified.

The above descriptions are only exemplary embodiments of the present disclosure and are not intended to limit the present disclosure. Any modifications, equivalent substitutions, improvements, etc. made within the spirit and principle of the present disclosure shall be included in the protection scope of the present disclosure.

What is claimed is:

1. A channel monitoring method, comprising:
   obtaining scan data collected by a vehicle body collection component of an automated guided vehicle (AGV) in an area around a vehicle body, wherein the AGV is one of a plurality of AGVs, the AGV of the plurality of AGVs travels in any one channel to be monitored of a plurality of channels to be monitored, the plurality of channels to be monitored are a plurality of channels required to transport a yarn spindle in a yarn spindle production workshop, and the area around the vehicle body includes at least a partial area of the channel to be monitored in which the AGV is traveling;
   obtaining video data collected by a camera in a video collection area, wherein the camera is one of a plurality of cameras and is used to collect video of at least a partial area of the channel to be monitored of the plurality of channels to be monitored, and the video collection area includes at least a partial area of the channel to be monitored which is collected by the camera;
   in a case of determining an existence of a target object based on the scan data collected by the vehicle body collection component and/or the video data collected by the camera, obtaining a target channel where the target object is located, wherein the target channel is one of the plurality of channels to be monitored;
   generating target warning information for the target channel where the target object is located; and
   inputting a scan image included in the scan data collected by the vehicle body collection component into a first detection model to obtain a first detection result, wherein the first detection model is used to identify whether there is at least a part of partial features of the target object in the scan image, and the first detection result represents whether the target object exists in the scan image included in the scan data.

2. The method of claim 1, wherein in a case of determining the existence of the target object based on the scan data collected by the vehicle body collection component and/or the video data collected by the camera, obtaining the target channel where the target object is located; and generating the target warning information for the target channel where the target object is located, comprise one of:
- in the case of determining the existence of the target object in the scan data collected by the vehicle body collection component based on the scan data, obtaining the target channel where the target object in the scan data is located, and generating scan warning information for the target channel where the target object in the scan data is located;
- in the case of determining the existence of the target object in the video data collected by the camera based on the video data, obtaining the target channel where the target object in the video data is located, and generating video warning information for the target channel where the target object in the video data is located; or
- in the case of determining the existence of the target object in the scan data collected by the vehicle body collection component based on the scan data, obtaining the target channel where the target object in the scan data is located; in the case of determining the existence of the target object in the video data collected by the camera based on the video data, obtaining the target channel where the target object in the video data is located; and in a case of determining that the obtained target channel where the target object in the scan data is located is a same as the obtained target channel where the target object in the video data is located, generating hybrid warning information for the target channel.

3. The method of claim 2, wherein priorities of the hybrid warning information, the scan warning information and the video warning information gradually decreases.

4. The method of claim 1, wherein inputting the scan image included in the scan data collected by the vehicle body collection component into the first detection model to obtain the first detection result, comprises:
- preprocessing the scan image included in the scan data collected by the vehicle body collection component to remove an edge area in the scan image and obtain a sub-image corresponding to a center area in the scan image; and
- inputting the sub-image corresponding to the center area in the scan image to the first detection model to obtain the first detection result,
- wherein the first detection model is used to extract features from the sub-image corresponding to the center area in the scan image, obtain a feature map of the center area, and detect whether there is at least a part of partial features of the target object in the feature map of the center area.

5. The method of claim 4, wherein the first detection model comprises at least a first network layer, a second network layer, and a third network layer,
- wherein the first network layer is used to perform feature extraction on the sub-image corresponding to the center area to obtain at least one feature map corresponding to the sub-image, wherein a quantity of the at least one feature map is negatively correlated to a size of a feature block of the at least one feature map,
- the second network layer is used to predict whether there is at least a part of partial features of the target object based on the at least one feature map corresponding to the sub-image, and obtain a probability value, and
- the third network layer is used to process the probability value to obtain a first value or a second value, wherein the first detection result is the first value or the second value, the first value is used to represent the presence of at least a part of the partial features of the target object, and the second value is used to represent the absence of at least a part of the partial features of the target object.

6. The method of claim 1, further comprising:
- inputting the video data collected by the camera into a second detection model to obtain a second detection result, wherein the second detection model is used to identify whether the target object exists in the video data, the second detection result represents whether the target object exists in the video data, and a time complexity of the second detection model is greater than a time complexity of the first detection model.

7. The method of claim 6, wherein inputting the video data collected by the camera into the second detection model to obtain the second detection result, comprises:
- preprocessing the video data collected by the camera to obtain a video image set, wherein the video image set includes at least one group of two adjacent frames of video images, and the two adjacent frames of video images meet a requirement that a difference value between feature maps of the two adjacent frames of video images is greater than a preset difference value;
- inputting each video image in the video image set to the second detection model to obtain a sub-result corresponding to the video image; and
- in a case of at least one sub-result among sub-results of all video images in the video image set is a third value, determining the third value as the second detection result; or in a case of a sub-result of each video image in the video image set is a fourth value, determining the fourth value as the second detection result, wherein the third value is used to represent the existence of the target object, and the fourth value is used to represent the existence of no target object.

8. The method of claim 7, wherein the second detection model comprises at least a fourth network layer, a fifth network layer and a sixth network layer,
- the fourth network layer comprises at least two dense layers connected in sequence, wherein a connection feature map of a previous dense layer is used as an initial feature map of a next dense layer, the at least two dense layers are used to perform convolution processing on the initial feature map to obtain a convolution feature map and perform connection processing on the initial feature map and the convolution feature map to obtain a connection feature map, and the initial feature map of a first dense layer of the at least two dense layers is obtained based on the video image,
- the fifth network layer is used to perform feature aggregation on the connection feature map of a last dense layer of the at least two dense layers to obtain a target feature map, and
- the sixth network layer is used to predict the target feature map to obtain the third value or the fourth value.

9. The method of claim 2, after obtaining the target channel where the target object in the video data is located, further comprising:
- determining whether the AGV is traveling in the target channel, wherein generating the video warning information for the target channel where the target object in the video data is located, comprises:
in a case of determining the AGV being traveling, generating the video warning information for the target channel where the target object in the video data is located.

10. An electronic device, comprising:
at least one processor; and
a memory connected in communication with the at least one processor,
wherein the memory stores an instruction executable by the at least one processor, and the instruction, when executed by the at least one processor, enables the at least one processor to execute:
obtaining scan data collected by a vehicle body collection component of an automated guided vehicle (AGV) in an area around a vehicle body, wherein the AGV is one of a plurality of AGVs, the AGV of the plurality of AGVs travels in any one channel to be monitored of a plurality of channels to be monitored, the plurality of channels to be monitored are a plurality of channels required to transport a yarn spindle in a yarn spindle production workshop, and the area around the vehicle body includes at least a partial area of the channel to be monitored in which the AGV is traveling;
obtaining video data collected by a camera in a video collection area, wherein the camera is one of a plurality of cameras and is used to collect video of at least a partial area of the channel to be monitored of the plurality of channels to be monitored, and the video collection area includes at least a partial area of the channel to be monitored which is collected by the camera;
in a case of determining an existence of a target object based on the scan data collected by the vehicle body collection component and/or the video data collected by the camera, obtaining a target channel where the target object is located, wherein the target channel is one of the plurality of channels to be monitored;
generating target warning information for the target channel where the target object is located; and
inputting a scan image included in the scan data collected by the vehicle body collection component into a first detection model to obtain a first detection result, wherein the first detection model is used to identify whether there is at least a part of partial features of the target object in the scan image, and the first detection result represents whether the target object exists in the scan image included in the scan data.

11. The electronic device of claim 10, wherein the instruction, when executed by the at least one processor, enables the at least one processor to execute one of:
in the case of determining the existence of the target object in the scan data collected by the vehicle body collection component based on the scan data, obtaining the target channel where the target object in the scan data is located, and generating scan warning information for the target channel where the target object in the scan data is located;
in the case of determining the existence of the target object in the video data collected by the camera based on the video data, obtaining the target channel where the target object in the video data is located, and generating video warning information for the target channel where the target object in the video data is located; or in the case of determining the existence of the target object in the scan data collected by the vehicle body collection component based on the scan data, obtaining the target channel where the target object in the scan data is located; in the case of determining the existence of the target object in the video data collected by the camera based on the video data, obtaining the target channel where the target object in the video data is located; and in a case of determining that the obtained target channel where the target object in the scan data is located is a same as the obtained target channel where the target object in the video data is located, generating hybrid warning information for the target channel.

12. The electronic device of claim 11, wherein priorities of the hybrid warning information, the scan warning information and the video warning information gradually decreases.

13. The electronic device of claim 10, wherein the instruction, when executed by the at least one processor, enables the at least one processor to execute:
preprocessing the scan image included in the scan data collected by the vehicle body collection component to remove an edge area in the scan image and obtain a sub-image corresponding to a center area in the scan image; and
inputting the sub-image corresponding to the center area in the scan image to the first detection model to obtain the first detection result,
wherein the first detection model is used to extract features from the sub-image corresponding to the center area in the scan image, obtain a feature map of the center area, and detect whether there is at least a part of partial features of the target object in the feature map of the center area.

14. A non-transitory computer-readable storage medium storing a computer instruction thereon, wherein the computer instruction is used to cause a computer to execute:
obtaining scan data collected by a vehicle body collection component of an automated guided vehicle (AGV) in an area around a vehicle body, wherein the AGV is one of a plurality of AGVs, the AGV of the plurality of AGVs travels in any one channel to be monitored of a plurality of channels to be monitored, the plurality of channels to be monitored are a plurality of channels required to transport a yarn spindle in a yarn spindle production workshop, and the area around the vehicle body includes at least a partial area of the channel to be monitored in which the AGV is traveling;
obtaining video data collected by a camera in a video collection area, wherein the camera is one of a plurality of cameras and is used to collect video of at least a partial area of the channel to be monitored of the plurality of channels to be monitored, and the video collection area includes at least a partial area of the channel to be monitored which is collected by the camera;
in a case of determining an existence of a target object based on the scan data collected by the vehicle body collection component and/or the video data collected by the camera, obtaining a target channel where the target object is located, wherein the target channel is one of the plurality of channels to be monitored;
generating target warning information for the target channel where the target object is located; and
inputting a scan image included in the scan data collected by the vehicle body collection component into a first detection model to obtain a first detection result, wherein the first detection model is used to identify whether there is at least a part of partial features of the target object in the scan image, and the first detection result represents whether the target object exists in the scan image included in the scan data.

15. The storage medium of claim 14, wherein the computer instruction is used to cause a computer to execute one of:
in the case of determining the existence of the target object in the scan data collected by the vehicle body collection component based on the scan data, obtaining the target channel where the target object in the scan data is located, and generating scan warning information for the target channel where the target object in the scan data is located;
in the case of determining the existence of the target object in the video data collected by the camera based on the video data, obtaining the target channel where the target object in the video data is located, and generating video warning information for the target channel where the target object in the video data is located; or
in the case of determining the existence of the target object in the scan data collected by the vehicle body collection component based on the scan data, obtaining the target channel where the target object in the scan data is located; in the case of determining the existence of the target object in the video data collected by the camera based on the video data, obtaining the target channel where the target object in the video data is located; and in a case of determining that the obtained target channel where the target object in the scan data is located is a same as the obtained target channel where the target object in the video data is located, generating hybrid warning information for the target channel.

16. The storage medium of claim 15, wherein priorities of the hybrid warning information, the scan warning information and the video warning information gradually decreases.

17. The storage medium of claim 14, wherein the computer instruction is used to cause a computer to execute:
preprocessing the scan image included in the scan data collected by the vehicle body collection component to remove an edge area in the scan image and obtain a sub-image corresponding to a center area in the scan image; and
inputting the sub-image corresponding to the center area in the scan image to the first detection model to obtain the first detection result,
wherein the first detection model is used to extract features from the sub-image corresponding to the center area in the scan image, obtain a feature map of the center area, and detect whether there is at least a part of partial features of the target object in the feature map of the center area.

* * * * *